Patented Apr. 1, 1930

1,752,492

UNITED STATES PATENT OFFICE

LUCAS P. KYRIDES, OF BUFFALO, NEW YORK, ASSIGNOR TO NATIONAL ANILINE & CHEMICAL CO., INC., OF NEW YORK, N. Y., A CORPORATION OF NEW YORK

PROCESS OF MAKING QUINALDINE

No Drawing. Application filed July 16, 1923. Serial No. 651,964.

This invention relates to improvements in the manufacture and production of quinaldine.

It is well known that quinaldine can be produced by the action of aldol or crotonaldehyde on aniline in the presence of acids and in the presence or absence of oxidants, such as, for example, nitrobenzene.

According to the present invention, in the production of quinaldine by the action of aldol or crotonaldehyde on aniline in the presence of acids and in the presence or absence of nitrobenzene, I have found that the amount of quinaldine produced is materially affected by the temperature and the manner in which the substances are mixed and brought into reaction. I have found that superior yields of quinaldine can be obtained by slowly and gradually adding aldol or crotonaldehyde to a hot mixture of aniline and acid, and in the presence or absence of nitrobenzene.

In carrying out the invention, aniline is added, without cooling, to a well-stirred mixture of acid and nitrobenzene, and to the mixture thus obtained, preferably heated to and maintained at a temperature of, say, about 90°–110° C., aldol or crotonaldehyde is slowly and gradually added. The reaction is completed by further heating the mixture and the quinaldine isolated and purified by methods well known to the art.

The following specific example will further illustrate the invention, but it is understood that the invention is not limited thereto.

*Example*

116 lbs. of aniline are added to a well-stirred mixture of 240 lbs. of hydrochloric acid (sp. gr. 1.16) and 44 lbs. of nitrobenzene in an earthenware vessel equipped with an agitator, a thermometer, and a reflux condenser. The heat of reaction raises the temperature of the mixture to about 80–85° C. By means of an oil or salt-water bath, or other suitable means, the mixture is then heated to a temperature of about 95–105° C., and 102 lbs. of crotonaldehyde $CH_3CH:CH.CHO$ are slowly added over a period of about 30–40 minutes, taking care that the agitation is vigorous and that a temperature of about 97°–102° C. is maintained. The temperature may be controlled by external cooling or heating and by varying the speed of addition of the crotonaldehyde. After all of the crotonaldehyde has been added, the agitation and the temperature of the mixture is maintained for a further period of about 30–35 minutes, or until the reaction is complete. The quinaldine thus produced is isolated, recovered and purified by methods well known to the art. For example, the hot contents of the reaction vessel may be added to water, the solution cooled to about 5° C. by the addition of ice, and diluted to a volume of about 200 gallons. Sufficient sodium nitrite, about 36 lbs., is then added to the cold solution until diazotization is complete. The solution is then allowed to stand and is subsequently separated from the oil which settles out. After extraction with toluene, the aqueous solution is made slightly alkaline by the addition of caustic soda (about 280 lbs. of a 29.7 per cent solution) and the quinaldine which separates out as an oil is removed and purified by fractional distillation, preferably in a vacuum. Quinaldine has the formula—

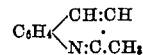

It is to be noted that in the above example the temperature at which the reaction is carried out may be varied considerably, but preferably it is in the neighborhood of the boiling-point of the mixture which is approximately the temperature at which water distils from the mixture into the reflux condenser, and usually ranges from about 90° to 110° C. Lower temperatures can be employed; but within the limits, the lower the temperature the less the amount of quinaldine produced. It is to be further noted that the order or manner in which the aniline, hydrochloric acid and nitrobenzene are mixed is not of substantial importance; but the manner of bringing the crotonaldehyde into reaction with the aniline-acid mixture, either in the presence or absence of nitrobenzene, and the temperature of said aniline-acid mixture at the time and during the addition of the crotonaldehyde to it, constitute important features in this invention. It is to be noted that the nitrobenzene, if used, may be mixed with the crotonaldehyde instead of with the aniline and acid as described in the above example. It is also to be noted that acids other than hydrochloric acid may be used, for example, sulfuric acid.

I claim:

1. An improved process of manufacturing quinaldine from aniline and one member of the group comprising the two compounds, aldol and crotonaldehyde, in the presence of mineral acid which comprises heating one of the organic reacting ingredients to or near its boiling point and then adding the other ingredient thereto while maintaining the reaction mixture at or near its boiling temperature.

2. An improved process of manufacturing quinaldine which comprises bringing a mixture comprising aniline and a mineral acid to the boiling point and then adding thereto one member of the group comprising the two compounds aldol and crotonaldehyde.

3. In the production of quinaldine, the process which comprises the gradual addition of one member of the group comprising the two compounds, aldol and crotonaldehyde, to a mixture of aniline, nitrobenzene and a mineral acid which is maintained at a temperature of about 90–110° C.

4. In the process of making quinaldine by the action of crotonaldehyde and aniline in the presence of hydrochloric acid and nitrobenzene, the improvement which comprises the slow and gradual addition of the crotonaldehyde to the mixture of aniline, nitrobenzene and acid, which is at a temperature of about 90–110° C.

5. In the process of making quinaldine by the addition of crotonaldehyde to aniline and a suitable acid in the presence of nitrobenzene, the step which comprises the addition of the crotonaldehyde at such a rate that a reaction temperature of 90–110° C. is maintained.

6. In the process of making quinaldine, the improvement which comprises bringing crotonaldehyde and aniline into contact in the the presence of nitrobenzene and hydrochloric acid at a temperature of about 90–110° C.

7. In the process of making quinaldine, the improvement which comprises bringing crotonaldehyde and aniline into contact in the presence of nitrobenzene and hydrochloric acid at a temperature of about 95–105° C., and maintaining this temperature until the reaction is substantially completed.

8. The process of manufacturing quinaldine which comprises heating a mixture comprising aniline and a mineral acid to the boiling point and adding crotonaldehyde thereto at such a rate as to maintain the reaction mixture at the boiling point.

In testimony whereof I affix my signature.

LUCAS P. KYRIDES.